United States Patent [19]

Arai et al.

[11] Patent Number: 4,539,615

[45] Date of Patent: Sep. 3, 1985

[54] AZIMUTHAL MAGNETIC RECORDING AND REPRODUCING APPARATUS

[75] Inventors: Takao Arai; Shigeru Yamazaki, both of Yokohama; Yasunori Kanazawa, Hachioji; Takaharu Noguchi, Yokohama, all of Japan

[73] Assignee: Ltd. Hitachi, Tokyo, Japan

[21] Appl. No.: 386,073

[22] Filed: Jun. 7, 1982

[30] Foreign Application Priority Data

Jun. 8, 1981 [JP] Japan .................. 56-86940
Jun. 8, 1981 [JP] Japan .................. 56-86941
Jun. 26, 1981 [JP] Japan .................. 56-98251
Aug. 17, 1981 [JP] Japan .................. 56-127799

[51] Int. Cl.³ ............................................. G11B 5/28
[52] U.S. Cl. ..................................... 360/121; 360/76
[58] Field of Search .................. 360/77, 21, 75, 76, 360/78, 121

[56] References Cited

U.S. PATENT DOCUMENTS 4,321,634  3/1982  Lehureau .................. 360/21 X
4,424,541  1/1984  Koinuma .................. 360/75

Primary Examiner—A. J. Heinz
Attorney, Agent, or Firm—Antonelli, Terry & Wands

[57] ABSTRACT

An azimuthal magnetic recording and reproducing apparatus comprises a magnetic head including at least one head gap for the recording and reproduction of information on and from recording tracks extending in the longitudinal direction of a magnetic tape. In the apparatus, the head gap is disposed to make the recording and reproducing operation so that the direction of magnetization on one of the recording tracks differs from that on the adjacent one.

11 Claims, 36 Drawing Figures

FIG. 5
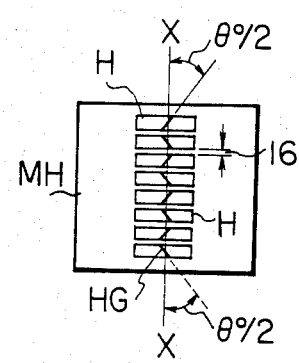
FIG. 6
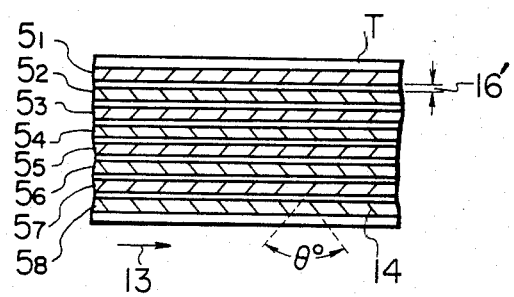
FIG. 7A  FIG. 7B  FIG. 7C
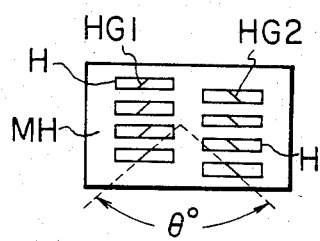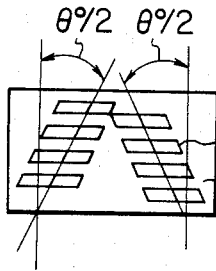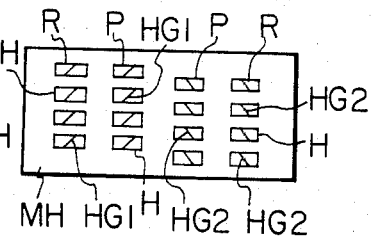
FIG. 8
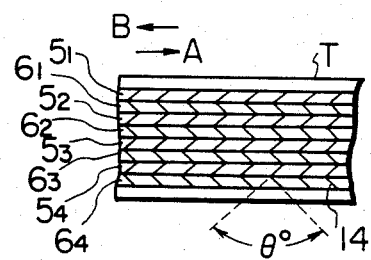

FIG. 12A  FIG. 12B  FIG. 13
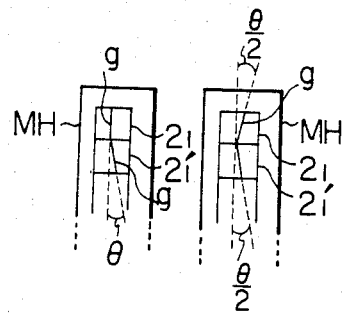
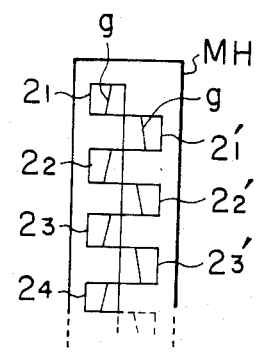
FIG. 14A
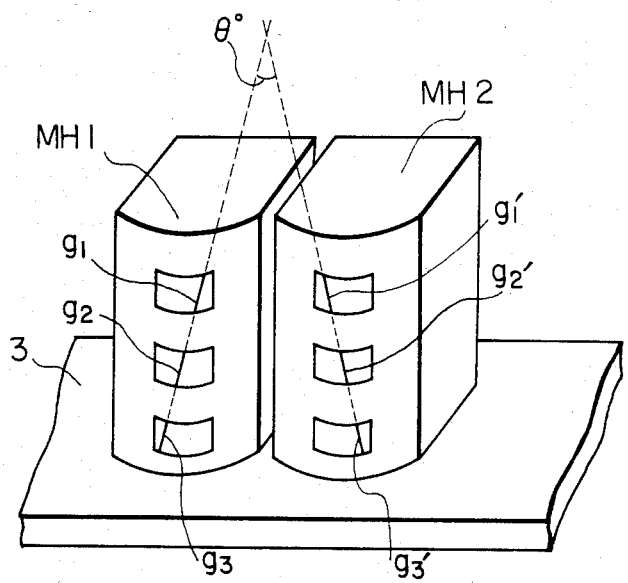
FIG. 14B
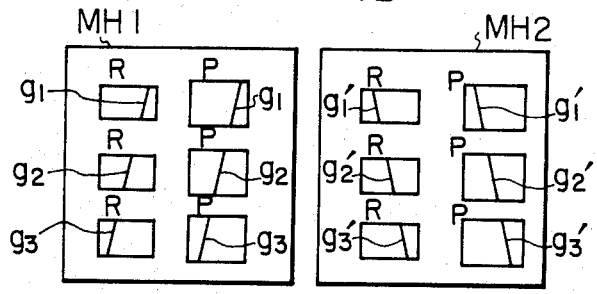

AZIMUTHAL MAGNETIC RECORDING AND REPRODUCING APPARATUS

This invention relates to an azimuthal magnetic recording and reproducing apparatus in which each of a plurality of recording tracks extending in the longitudinal direction of a magnetic tape is magnetized in a direction different from that of the adjacent one so that an information signal can be recorded on the recording tape in a high recording density and can then be reproduced therefrom.

In a recorder such as a tape recorder or a data recorder using a magnetic tape, the technique is commonly known according to which an information signal is recorded on and reproduced from a plurality of tracks arranged in parallel to each other in the widthwise direction of the magnetic tape, that is, in the direction orthogonal with respect to the travelling direction of the magnetic tape. Because of such a manner of recording and reproduction, the magnetic tape is driven in the forward and backward directions or is driven once in one direction or is repeatedly driven in one direction only, and a magnetic head having a very small width is used for the purpose of recording and reproduction. The magnetic head used for this purpose has a single head gap or a plurality of head gaps. When the magnetic head having the single head gap is used, the magnetic head is moved in the widthwise direction of the magnetic tape each time the magnetic tape has been driven in a predetermined direction. On the other hand, when the magnetic head having the plural head gaps is used, the operating head gaps are sequentially electrically switched over each time the magnetic tape has been driven in the forward and backward directions. The magnetic head of the type in which the head gaps are sequentially electrically switched over is superior in the structural aspect to the magnetic head of the single head gap type, since the former does not require complex means for displacing or moving the magnetic head relative to the magnetic tape.

A prior art magnetic head having such a plurality of head gaps will be described in further detail.

FIG. 1 is a perspective view of such a prior art magnetic head used for two-way recording and reproduction. Referring to FIG. 1, the magnetic head 1 is shown to include two head gaps $2_1$ and $2_2'$ to be used for forward scanning and two head gaps $2_1'$ and $2_2'$ to be used for backward scanning and is supported on a head support 3.

FIG. 2 shows schematically patterns recorded on a magnetic tape T by the magnetic head 1 shown in FIG. 1. Referring to FIG. 2, the magnetic tape T includes recording tracks $5_1$ and $5_2$ recorded with information during the travel of the magnetic tape T in the forward direction (which tracks will be referred to hereinafter as forward recording tracks), recording tracks $6_1$ and $6_2$ recorded with information during the travel of the magnetic tape T in the backward direction (which tracks will be referred to hereinafter as backward recording tracks), and guard bands GB separating the tracks $5_1$, $5_2$, $6_1$ and $6_2$. The numeral 8 designates magnetization patterns formed on these recording tracks.

The operation of the prior art magnetic head will now be described.

In FIG. 2, the magnetic tape T is driven in a direction as shown by the arrow A for its forward travel, and the head gaps $2_1$ and $2_2$ of the magnetic head 1 are selected to record information on the forward recording tracks $5_1$ and $5_2$ respectively. After recording of information by the forward travel of the magnetic tape T, the travelling direction is reversed to a direction as shown by the arrow B, and head gaps $2_1'$ and $2_2'$ of the magnetic head 1 are now selected by a head change-over means (not shown) for changing over the heads electrically. The head gaps $2_1'$ and $2_2'$ of the magnetic head 1 record information on the backward recording tracks $6_1$ and $6_2$ respectively of the magnetic tape T.

In this manner, two-way recording is done on the magnetic tape T. In the playback mode, the forward recording and reproducing head gaps $2_1$ and $2_2$ scan the respective forward recording tracks $5_1$ and $5_2$ of the magnetic tape T driven in the direction of the arrow A, and, then, the backward recording end reproducing head gaps $2_1'$ and $2_2'$ scan the respective backward recording tracks $6_1$ and $6_2$ of the magnetic tape T driven in the direction of the arrow B. Of course, the magnetic head 1 may merely have the two recording and reproducing head gaps $2_1$ and $2_2$, and such a magnetic head 1 may be moved in the widthwise direction of the magnetic tape T depending on whether the magnetic tape T is driven in the forward direction or backward direction, so as to record and reproduce information on and from the recording tracks $5_1$ and $5_2$ or $6_1$ and $6_2$.

Recording on the recording tracks $6_1$ and $6_2$ described above may also be done by, for example, inverting the tape cassette containing the magnetic tape, that is, by turning over the cassette.

The head gaps $2_1$ and $2_2$ of the prior art magnetic head 1 extend in the same direction or vertical direction in FIG. 1, and, because of the extending direction of the head gaps $2_1$ and $2_2$, the direction of the magnetization patterns 8 formed on the recording tracks $5_1$, $5_2$, $6_1$ and $6_2$, hence, the direction of magnetization orthogonal with respect to the recording tracks is the same. Therefore, when the recording tracks are close relative to each other, and a so-called tracking error occurs in the playback mode, reproduction of information from one of the recording tracks may be encountered with the problem of crosstalk due to partial reproduction of information from the adjacent one of the recording tracks. Therefore, the guard bands GB, which are the regions carrying no records, are provided between the individual recording tracks so that crosstalk as described above may not occur.

Various apparatus using a stationary multihead are also widely known. As an example, a compact cassette deck as shown in FIG. 3 is known, in which a stationary multihead M2 is used for two-way recording and reproduction. Referring to FIG. 5, a magnetic tape T is driven in a direction as shown by the arrow A (the forward direction), and two recording and reproducing heads 21 and 22 of the multihead M2 record information on two recording tracks $5_1$ and $5_2$ respectively of the magnetic tape T. Then, the magnetic tape T is driven in the other direction shown by the arrow B (the backward direction), and other two recording and reproducing heads 23 and 24 of the multihead M2 record information on two recording tracks $6_1$ and $6_2$ respectively of the magnetic tape T. In this manner, two-way records are provided on the magnetic tape T. In the playback mode, the recording and reproducing heads $2_1$ and $2_2$ scan the recording tracks $5_1$ and $5_2$ respectively of the magnetic tape T driven in the direction A, and the recording and reproducing heads 23 and 24 scan the recording tracks 6₁ and 6₂ respectively of the magnetic tape T driven in the direction B.

In the magnetic head structure shown in FIG. 3 too, the problem of crosstalk as described above is also inevitable due to the same orientation of the head gaps g, and guard bands GB are similarly required.

As another prior art example, there is a data recorder adapted for one-way recording and reproduction by a multihead M3 as shown in FIG. 4. In this case too, the head gaps g of individual recording and reproducing heads 2₁ to 2₁₀ of the multihead M3 are oriented in the same direction, and the magnetization patterns 8 of records formed on recording tracks 5₁ to 5₁₀ of a magnetic tape T are also oriented in the same direction. Therefore, guard bands GB are similarly provided to separate the individual recording tracks.

In a prior art magnetic recording and reproducing apparatus using a multihead, the width of the head gaps, equal to track's width, of the recording and reproducing heads has been made as small as possible, and, because of the minimized gap width, a considerable improvement in the recording density could be achieved. However, as described with reference to FIGS. 2 to 4, the guard bands GB had to be provided between the recording tracks TR, and the provision of such guard bands GB not contributing to the recording of information has given rise to the defect that the recording density is reduced by the amount corresponding to the areas occupied by the guard bands GB.

It is therefore an object of the present invention to provide a novel and improved magnetic recording and reproducing apparatus in which an azimuth angle is provided between the magnetization patterns of records formed on adjacent recording tracks of a magnetic tape so as to minimize the possibility of crosstalk of information between such tracks.

Another object of the present invention is to provide a magnetic recording and reproducing apparatus in which an azimuth loss is positively utilized for the desired attainment of high-density recording and reproduction without making complex the structure of the magnetic recording and reproducing apparatus.

Still another object of the present invention is to provide a magnetic recording and reproducing apparatus in which, besides the capability of high-density recording and reproduction utilizing the azimuth loss, the S/N ratio is not degraded by the presence of a tracking error.

Yet another object of the present invention is to provide a magnetic recording and reproducing apparatus which is provided with a cassette-tape travelling direction identifying mechanism which identifies the travelling direction of a multitrack cassette tape thereby automatically orienting the head gaps of a multihead in the direction of correct inclination.

A further object of the present invention is to provide a magnetic recording and reproducing apparatus which can handle a magnetic tape having a large number of recording tracks so that the desired reduction of the transmission density per track in a PCM recorder using a stationary multihead can be satisfactorily achieved.

FIG. 5 is a front elevation view to illustrate schematically the head gap arrangement in one form of the magnetic head employed in an embodiment of the apparatus according to the present invention.

FIG. 6 is a front elevation view to illustrate schematically the patterns of records magnetically formed on a magnetic tape by the magnetic head shown in FIG. 5.

FIGS. 7a and 7b are front elevation views to illustrate schematically the head gap arrangement in other forms respectively of the magnetic head of multihead type employed in other embodiments of the apparatus according to the present invention, in each of which the magnetic head is held stationary and a magnetic tape contained in, for example, a tape cassette is driven in one direction and the other without turning over the tape cassette.

FIG. 7c is a schematic front elevation view of another form of the multihead employed in the present invention, in which each of the recording and reproducing heads shown in FIG. 7a is replaced by a pair of a recording head and a reproducing head.

FIG. 8 is a front elevation view to illustrate schematically the patterns of records magnetically formed on a magnetic tape by the magnetic head shown in FIG. 7a, 7b or 7c.

Figure 1:
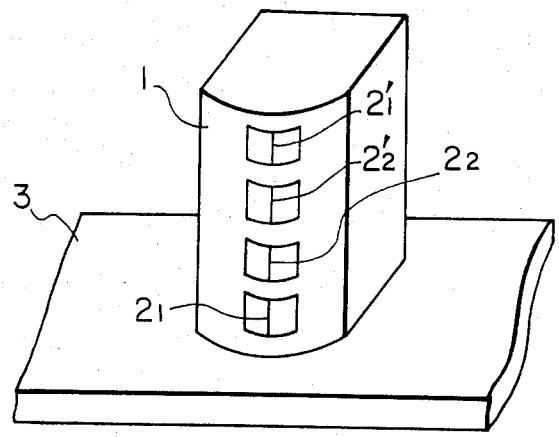
FIG. 1 is a perspective view of a prior art magnetic head used for multitrack recording on a magnetic tape.
Figure 2:
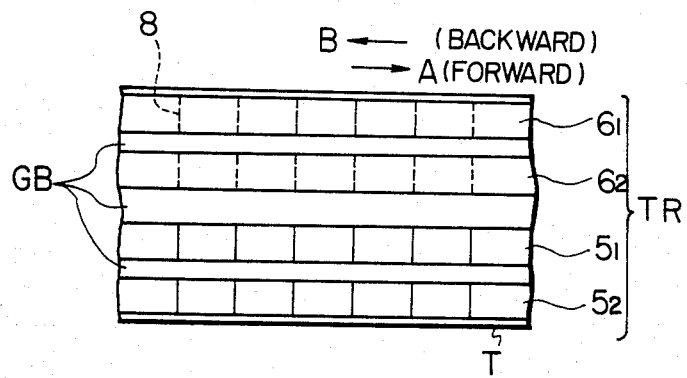
FIG. 2 is a plan view of a magnetic tape to schematically illustrate the patterns of records magnetically formed by two-way recording with the magnetic head shown in FIG. 1.
Figure 3:
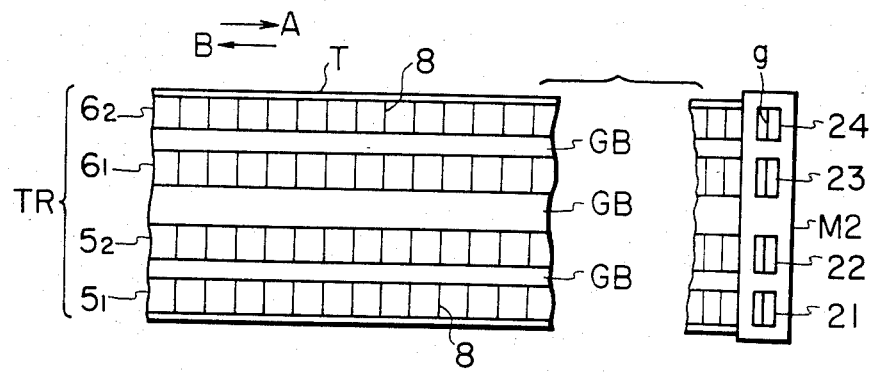
FIG. 3 shows schematically the head gap arrangement in a prior art magnetic recording and reproducing head and shows also the patterns magnetically recorded on a magnetic tape by such a magnetic head.
Figure 4:
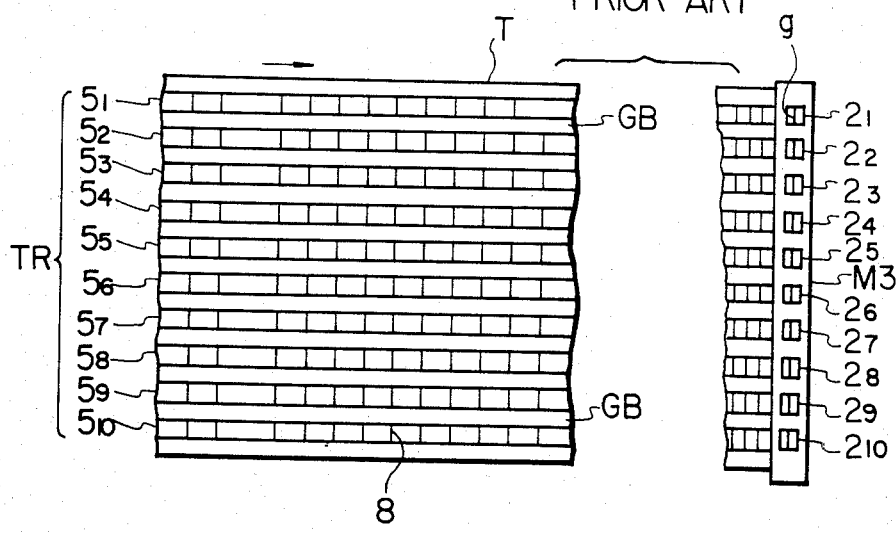
FIG. 4 shows schematically the head gap arrangement in a prior art magnetic head of multihead type and shows also the patterns magnetically recorded on a magnetic tape by such a magnetic head.
Figure 9:
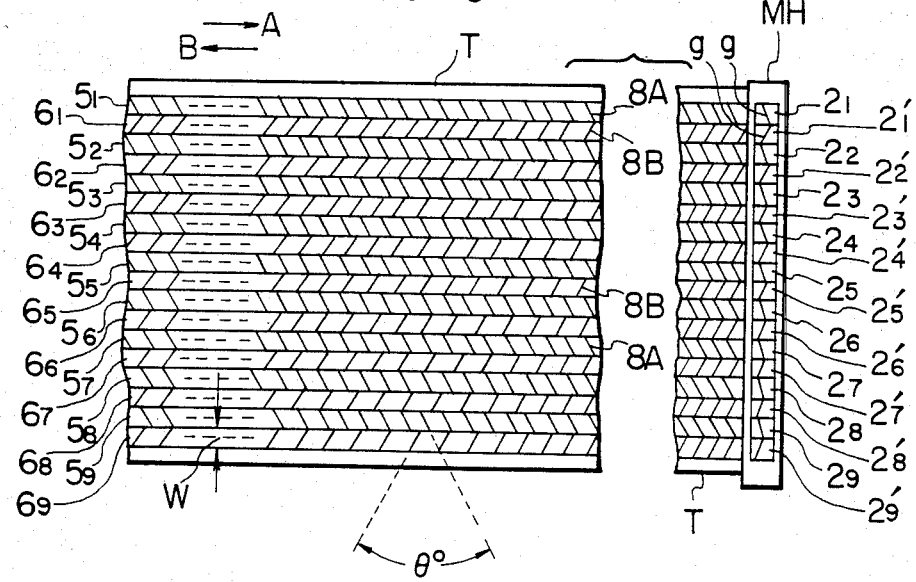

FIG. 9 is a front elevation view to illustrate schematically the head gap arrangement in still another form of the magnetic head employed in another embodiment of the apparatus according to the present invention and to illustrate also the patterns of records magnetically formed on a magnetic tape by such a magnetic head.

Figure 10:
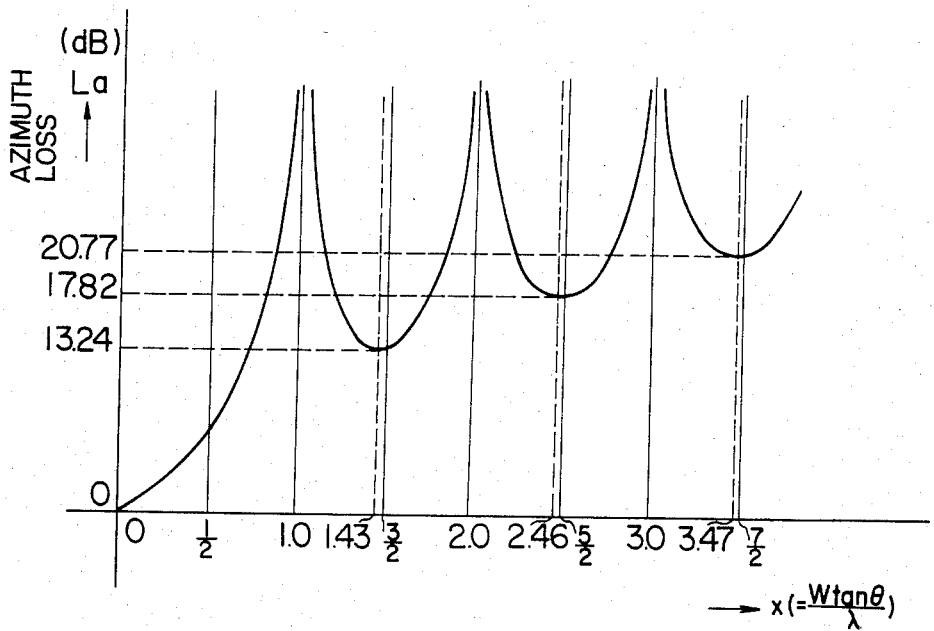

FIG. 10 is a graph illustrating the azimuth loss in the embodiment of the present invention shown in, for example, FIG. 9.

Figure 11:
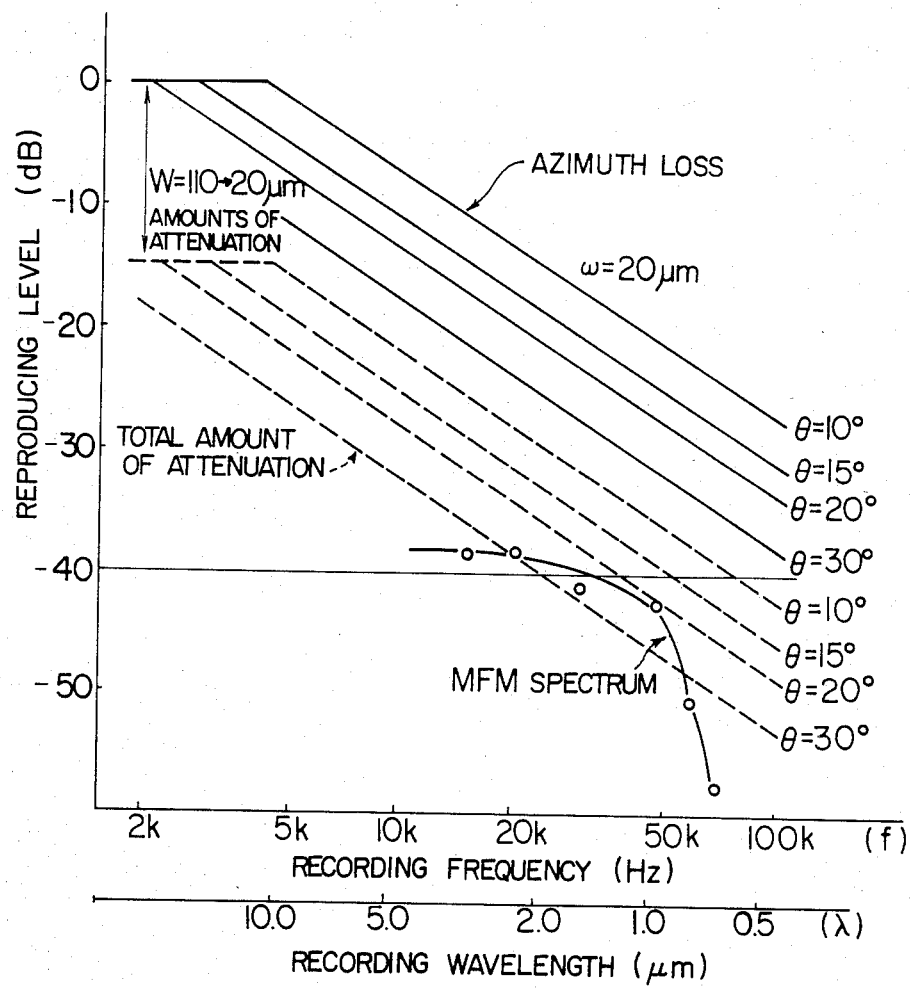

FIG. 11 is a graph illustrating the azimuth loss and MFM spectrum in an embodiment of the present invention.

FIGS. 12a, 12b and 13 are front elevation views to schematically illustrate the head gap arrangement other forms of the magnetic head employed in other embodiments of the apparatus according to the present invention.

FIG. 14A is a perspective view to schematically illustrate the head gap arrangement in still another form of the magnetic head employed in another embodiment of the apparatus according to the present invention.

FIG. 14B is a front elevation view to schematically illustrate the head gap arrangement when each of the recording and reproducing heads shown in FIG. 14A is replaced by a pair of a recording head and a reproducing head.

Figure 15:
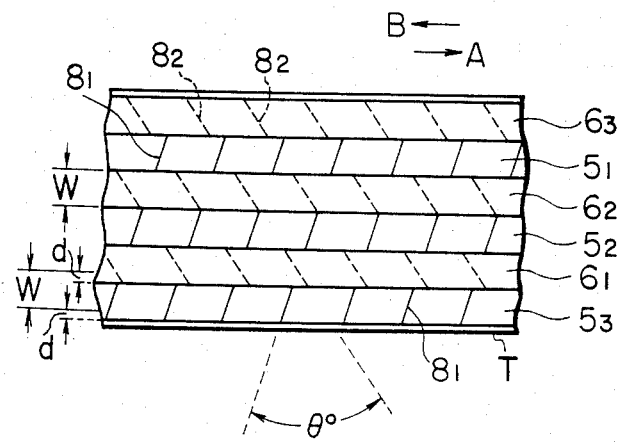

FIG. 15 is a front elevation view to schematically illustrate the patterns of records magnetically formed on a magnetic tape by the magnetic head shown in FIG. 14A.

Figure 16A:
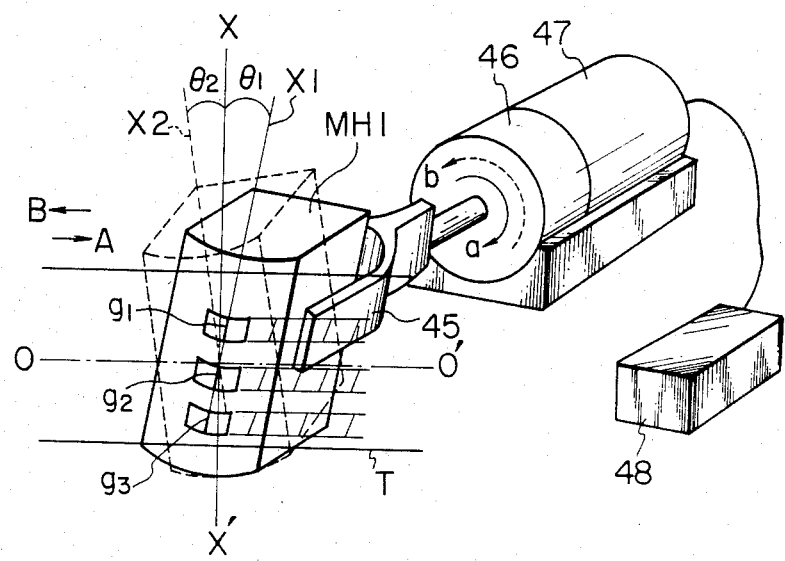

FIG. 16A is a perspective view showing one form of magnetic head rotating means suitable for use in an embodiment of the apparatus of the present invention.

Figure 16B:
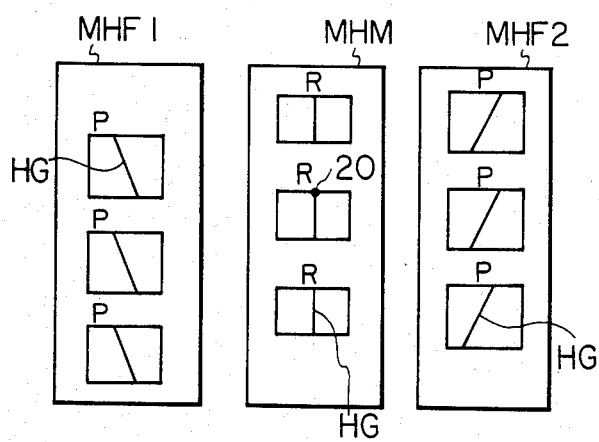

FIG. 16B is a front elevation view to illustrate schematically the head gap arrangement when the recording and reproducing head shown in FIG. 16A is replaced by a recording head and two reproducing heads.

Figure 16C:
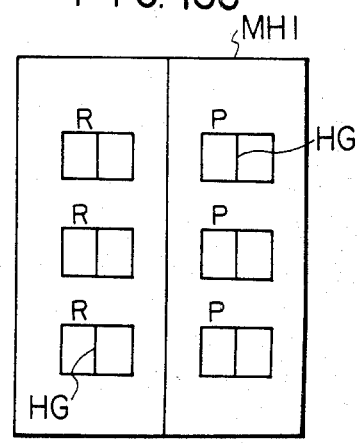

FIG. 16C is a front elevation view to schematically illustrate the head gap arrangement when the recording and reproducing head shown in FIG. 16A is divided into a recording head and a reproducing head.

Figure 17:
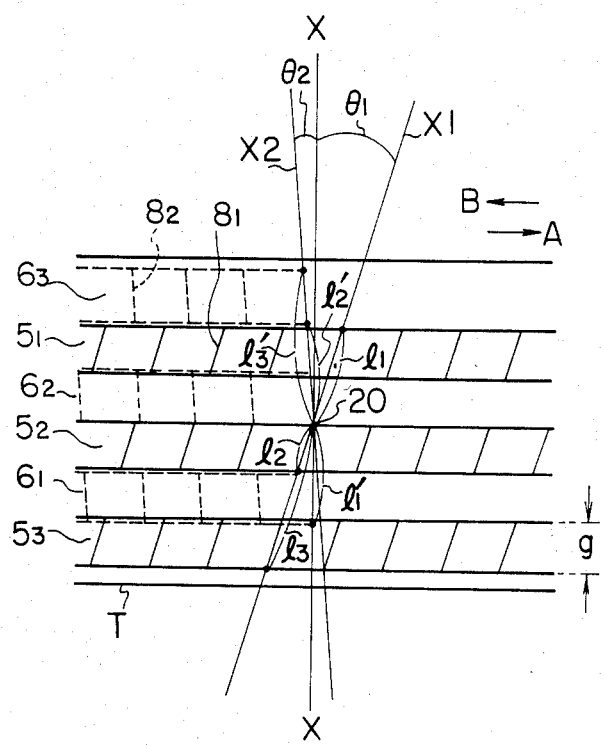
Figure 18:
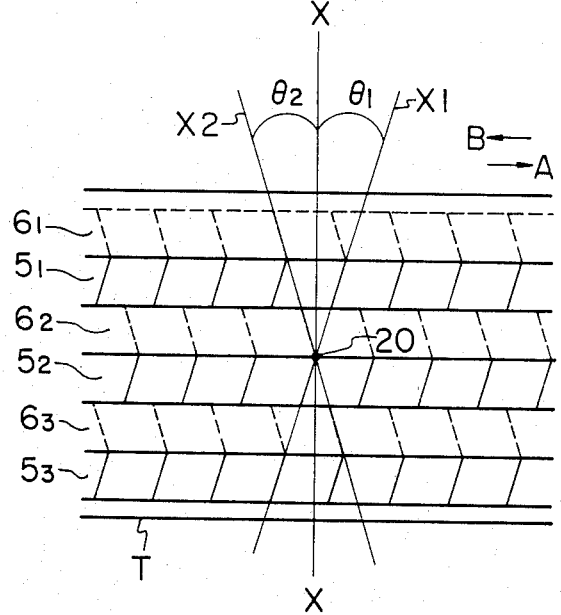

FIGS. 17 and 18 are front elevation views to schematically illustrate the patterns of records magnetically formed by the magnetic head shown in FIG. 16A.

Figure 19:
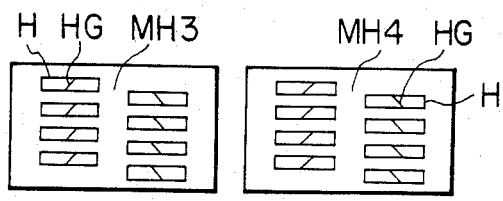

FIG. 19 is a front elevation view to schematically illustrate the head gap arrangement in another form of the magnetic head employed in another embodiment of the apparatus according to the present invention.

FIGS. 20 to 25 show schematically the magnetically formed patterns for illustrating the S/N ratio of a reproduced signal when the redproducing track width is not equal to the recording track width.

Figure 24:
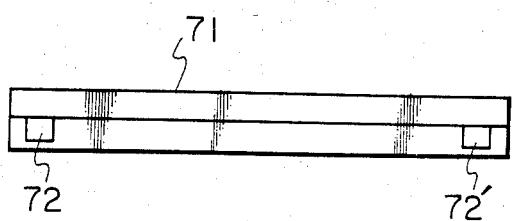
Figure 25:
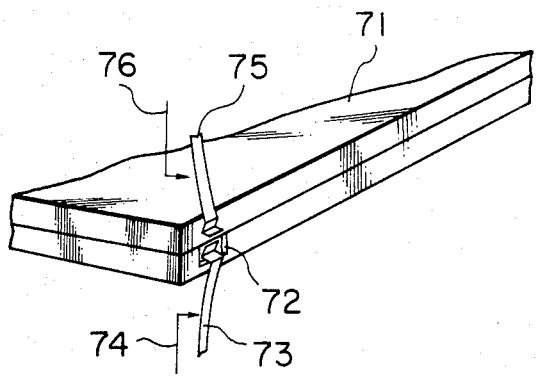

FIGS. 24 and 25 are a side elevation view and a perspective view respectively of one form of means employed in an embodiment of the present invention for automatically identifying the travelling direction of a magnetic tape.

Figure 26:
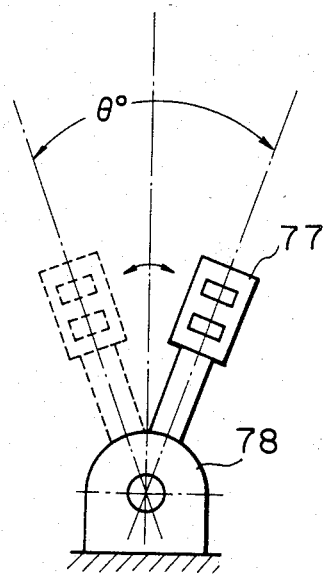

FIG. 26 is a front elevation view of one form of magnetic head inclination change-over means preferably employed in the present invention for establishing the azimuth angle of the head gaps of the magnetic head.

Figure 27:
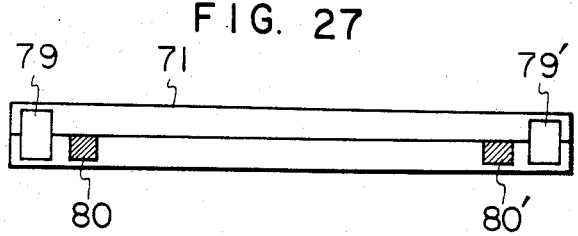
Figure 28:
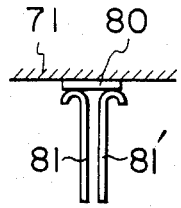

FIGS. 27 and 28 are side elevation views of other forms respectively of the means for automatically identifying the travelling direction of a magnetic tape.

Figure 29:
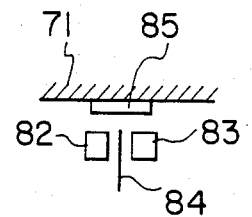
Figure 30:
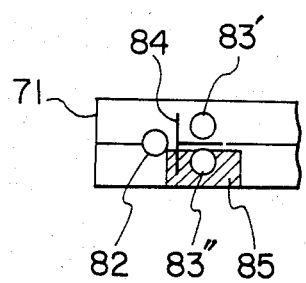

FIGS. 29 and 30 are a plan view and a side elevation view respectively of another form of the means for automatically identifying the travelling direction of a magnetic tape.

Referring now to the drawings, FIG. 5 is a front elevation view of a multitrack recording and reproducing magnetic head MH employed in an embodiment of the magnetic recording and reproducing apparatus according to the present invention. As shown in FIG. 5, the head gaps HG of the individual heads H make an angle of $\theta/2$ with the axis X—X extending orthogonally with respect to the travelling direction of a magnetic tape, and the orientation of each of these head gaps HG is opposite to that of the adjacent ones. In this embodiment, the magnetic head MH serving both of recording and reproduction of information is held stationary, and the information signal is recorded and/or reproduced only when the magnetic tape is driven in one way or in one direction.

FIG. 6 shows the state of data recorded on a magnetic tape T by the magnetic recording and reproducing head MH shown in FIG. 5. As shown in FIG. 6, the data are recorded on eight recording tracks $5_1$ to $5_8$ of the magnetic tape T, and the recording angles 14 on the adjacent recording tracks have inclinations opposite to each other, each angle corresponding to the angle $\theta/2$ shown in FIG. 5. Therefore, even if a tracking error may occur during reproduction from one of the tracks in the playback mode, the amount of crosstalk from the adjacent track can be made negligibly small by virtue of the azimuth loss which will be described later.

Since thus the provision of the azimuth angle $\theta$ between the adjacent head gaps HG of the heads H can make the adverse effect of crosstalk negligible even if a tracking error occurs in the playback mode, the thickness of the shielding sheet 16 interposed between the individual heads H of the multihead MH can be made smaller than hitherto. It will be seen in FIG. 6 that a non-recorded portion 16' corresponding to the thickness of the shielding sheet 16 shown in FIG. 5 will be left although it occupies a very small proportion.

Magnetic recording and reproducing heads MH as shown in FIGS. 7a and 7b are preferably used in order to eliminate such a non-recorded portion 16' and further increase or improve the recording density.

Each of FIGS. 7a and 7b shows the head gap arrangement in a magnetic head MH serving both of recording and reproduction, the magnetic head MH being held stationary relative to a magnetic tape which is driven for reciprocating movement without inverting, for example, a tape cassette, that is, without changing the widthwise upper and lower positions of the magnetic tape. In each of the magnetic heads MH shown in FIGS. 7a and 7b, the head gaps HG1 of heads H used exclusively for recording and reproduction when the magnetic tape is driven in the forward direction (which heads will be referred to hereinafter as forward recording and reproducing heads) make an azimuth angle $\theta$ with the corresponding head gaps HG2 of heads H used exclusively for recording and reproduction when the magnetic tape is driven in the backward direction (which heads will be referred to hereinafter as backward recording and reproducing heads). It will be also seen in FIGS. 7a and 7b that the array of the head gaps HG1 is so disposed relative to the array of the head gaps HG2 that the magnetization patterns formed by the former do not overlap those formed by the latter but adjoin each other. That is, these head gaps HG1 and HG2 are arranged in staggered relation.

Describing in further detail, the head cores H of the head stack MH shown in FIG. 7a are arrayed in a direction orthogonal with respect to the travelling direction of the magnetic tape, and the alternate ones of the head gaps HG1 and HG2 are disposed in staggered relation or juxtaposed in zigzag fashion while defining the azimuth angle $\theta$ therebetween. In the case of the head stack MH shown in FIG. 7b, the alternate ones of the head gaps HG are also disposed in staggered relation but the head gap arrays providing the recording angle of $\theta/2$ are inclined in opposite directions relative to each other. The head gaps HG1 and HG2 are changed over in accordance with the running direction of the tape, by the head change-over means (not shown) for changing over the head electrically.

FIG. 7c shows another form of the magnetic head MH having similarly the staggered head gap arrangement. In FIG. 7C, however, recording heads R and reproducing heads P are separately provided as shown.

By the use of the magnetic heads MH shown in FIGS. 7a, 7b and 7c, data can be recorded on a magnetic tape T without producing any non-recorded portions on the magnetic tape T as shown in FIG. 8.

FIG. 9 shows another form of the magnetic head employed in another embodiment of the magnetic recording and reproducing apparatus according to the present invention. In FIG. 9, the same reference numerals are used to designate the same or like parts employed in the aforementioned embodiments.

Referring to FIG. 9, a magnetic tape T is driven in a direction as shown by the arrow A, and forward recording and reproducing heads $2_1, 2_2, \ldots, 2_9$ of a stationary multihead MH record information on forward recording tracks $5_1, 5_2, \ldots, 5_9$ respectively of the magnetic tape T. Then, when the magnetic tape T is driven in the opposite direction shown by the arrow B, backward recording and reproducing heads $2_1', 2_2', \ldots, 2_9'$ record information on backward recording tracks $6_1$, $6_2, \ldots, 6_9$ respectively of the magnetic tape T. Since, in this case, the data are simultaneously recorded on the forward recording tracks $5_1, 5_2, \ldots, 5_9$ in the forward record mode, and the data are simultaneously recorded on the backward recording tracks $6_1, 6_2, \ldots, 6_9$ in the backward record mode, all the data are recorded on these recording tracks by the single two-way travel of the magnetic tape T.

As seen in FIG. 9, the orientation of the head gaps g of the forward recording and reproducing heads $2_1, 2_2, \ldots, 2_9$ makes an azimuth angle $\theta$ with that of the head gaps g of the backward recording and reproducing heads $2_1', 2_2', \ldots, 2_9'$. Consequently, the direction of magnetization patterns 8A formed on the forward recording tracks $5_1, 5_2, \ldots, 5_9$ differs from that of magnetization patterns 8B formed on the backward recording tracks $6_1, 6_2, \ldots, 6_9$. The direction of the magnetization patterns formed on one of the recording tracks is different from that of the magnetization patterns formed on the adjacent recording track due to the fact that the forward recording tracks $5_1, 5_2, \ldots, 5_9$ and the backward recording tracks $6_1, 6_2, \ldots, 6_9$ are arranged alternately in the widthwise direction of the magnetic tape T.

In the playback mode, the magnetic tape T is driven in the direction of the arrow A as in the forward record mode so as to scan the forward recording tracks $5_1, 5_2, \ldots, 5_9$ by the forward recording and reproducing heads $2_1, 2_2, \ldots, 2_9$ respectively, and the magnetic tape T is then driven in the direction of the arrow B so as to scan the backward recording tracks $6_1, 6_2, \ldots, 6_9$ by the backward recording and reproducing heads $2_1', 2_2', \ldots, 2_9'$, thereby reproducing the recorded signal.

When the direction of a magneticzation pattern formed on a recordng track of a magnetic tape makes an azimuth angle $\theta$ with the orientation of a head gap of a reproducing head, it is known that an azimuth loss La expressed by the following equation appears in the reproduced signal:

$$La = 20 \log_{10} \left[ \frac{\frac{\pi W}{\lambda} \tan \theta}{\sin \left( \frac{\pi W}{\lambda} \tan \theta \right)} \right] \quad (1)$$

where W is the width of the recording track scanned by the reproducing head, and $\lambda$ is the wavelength of the recording signal recorded on the recording track of the magnetic tape. This wavelength $\lambda$ is given by the following equation:

$$\lambda = \frac{V}{f} \quad (2)$$

where f is the frequency of the recording signal, and V is the travelling speed of the magnetic tape.

The present invention utilizes such an azimuthal effect. As described already with reference to FIG. 9, the directions of the magnetization patterns 8A and 8B formed on the adjacent recording tracks are different from each other and are the same as the orientations of the head gaps of the recording and reproducing heads scanning such recording tracks respectively. Consequently, there there exists the azimuth angle $\theta$ between the head gap of one of the recording and reproducing heads and the magnetization pattern formed on the recording track next adjacent to the recording track scanned by the specific recording and reproducing head. Therefore, when the entirety of such an adjacent recording track is scanned by the specific recording and reproducing head, the level of the signal reproduced therefrom is attenuated due to the azimuth loss La expressed by the equation (1). According to the present invention, the azimuth angle $\theta$ is so selected that the level of the signal reproduced from such an adjacent recording track by the specific recording and reproducing head is always lower than a predetermined setting regardless of the proportion of the width of the adjacent recording track scanned by the specific recording and reproducing head, whereby to eliminate the necessity for provision of the guard band GB between the recording tracks adjoining each other.

Such an azimuth angle $\theta$ is determined in a manner as will be described presently.

Now, the term $W \tan\theta/\lambda$ in the equation (1) is expressed by $x = W \tan\theta/\lambda$, and the azimuth loss La is calculated from the equation (1). The results are shown in FIG. 10. In the calculation, it is assumed that the width W of the recording track is 1 mm, the travelling speed V of the magnetic tape is 19 cm/sec, and the lowest frequency f of the recording signal is 1 kHz.

Under such conditions, the azimuth angle $\theta$ is calculated which can cause attenuation of 20 dB in the level of the signal reproduced from an adjacent recording track by one of the recording and reproducing heads shown in FIG. 9 due to a track displacement or a tracking error. That is, the azimuth angle $\theta$, which can provide such attenuation even when the reproducing head gap scans the full width W of the recording track adjacent to that to be scanned, is calculated from the equation (1). When the specific recording and reproducing head scans the adjacent recording track over a width portion which is, for example, 1/10 of the full width W of the adjacent recording track, the attenuation of 20 dB can be caused without resorting to the azimuth loss La, since the value of $20 \log_{10} 1/0.1$ is equal to 20 dB in the equation (1). In such a case, therefore, the azimuth loss La need not be especially considered.

Referring to FIG. 10 again, the relation between the azimuth loss La and the amount of attenuation dependent upon the proportion of the width portion of the adjacent track scanned by the specific recording and reproducing head will now be considered. The azimuth angle $\theta$ is preferably so determined that the sum of the value of the azimuth loss La at a bottom of its curve in FIG. 10 and the amount of attenuation dependent upon the proportion of the width portion of the adjacent recording track scanned by the recording and reproducing head is more than 20 dB. When, the value of x is selected to be, for example, x=5.47 in FIG. 10, the azimuth loss La of more than 20 dB is obtained even if the recording and reproducing head scans the full width W of the adjacent recording track. Thus, attenuation of more than 20 dB can be caused regardless of the proportion of the width portion of the adjacent recording track scanned by the recording and reproducing head.

The azimuth angle $\theta$ is therefore calculated to be $\theta = 33.5°$ from the value of x given by $x = W \tan\theta/\lambda = 3.47$, from the value of $\lambda = 19 \times 10^{-5}$ given by the equation (2) and from the value of $W = 10^{-3}$.

The above description refers merely to one example of the manner of determination of the azimuth angle $\theta$, and it is apparent that the azimuth angle $\theta$ can be suitably selected to meet specific conditions selected.

Table 1 shows the value of the azimuth angle $\theta$ satisfying various specific conditions.

TABLE 1

| W (μm) | f (kHz) | Desired attenuation (dB) | x | $\theta$ (°) |
|---|---|---|---|---|
| 1,000 | 1 | 20 | 3.47 | 33.5 |
| 100 | 10 | 20 | 3.47 | 33.5 |
| 100 | 50 | 20 | 3.47 | 7.5 |
| 100 | 100 | 20 | 3.47 | 3.78 |
| 100 | 100 | 30 | 10.02 | 10.78 |

As another embodiment, the present invention is applied to a multitrack PCM recorder using a compact cassette tape. The most suitable azimuth angle $\theta$ in such a recorder will now be discussed.

In such a PCM recorder, a data transmission rate as high as 1.5–2 Mbit/sec is generally required in view of the factors including the transmission signal bandwidth and the number of quantized bits. For example, the data transmission rate is 1.7 M bit/sec when the transmission signal bandwidth is 20 kHz and the number of quantized bits is 14 and also when the synchronizing signal part and error correcting words are taken into consideration. For the purpose of recording such information on a compact cassette tape which has a width of 3.81 mm and travels at a speed of 4.75 cm/sec, it is most preferable that the number of tracks is selected to be 32 (16 tracks provided for each way and including 2 control tracks) and the minimum wavelength recorded per track is selected to be about 0.8 μm, when the factors including the feasibility of recording of wavelengths and the circuit cost are taken into consideration. In such a tape, the width of each track is 110 μm when the width of the non-recordable portion in each of the tape edge areas is supposed to be 145 μm.

In the PCM recorder which is a digital recorder, low-frequency components are present in slight proportions only. Further, when a modulation method such as an MFM (modified frequency modulation) method is employed in such a recorder, the peak value of frequency components does not appear at the lowest recording wavelength but appears in the vicinity of a recording wavelength of 1 μm or a recording frequency of 50 kHz.

FIG. 11 shows the recording angle (azimuth angle) $\theta$ and the amount of attenuation due to the azimuth loss La when a tracking error on a magnetic tape covers a width w which is 20 μm at the maximum. The solid curves in FIG. 11 indicate the amounts of attenuation due to the azimuth loss at $\theta$ of 10°, 15°, 20° and 30° respectively, and the broken curves indicate the total amounts of attenuation each of which is the sum of the amount of attenuation indicated by the corresponding solid curve and the amount of attenuation of the reproduced signal level due to the decreased width of the track being reproduced. It will be seen in FIG. 11 that, although the amount of attenuation increases with the increase in the recording angle (azimuth angle) $\theta$, the rate of attenuation decreases. Therefore, the most suitable value of the azimuth angle $\theta$ must be selected taking into account the system mechanism and the required amount of attenuation.

The S/N ratio of the system is slightly higher than 30 dB, and, therefore, the required amount of attenuation should be about 40 dB under a severer condition or at a recording wavelength of 1 μm. Accordingly, the angle $\theta$ is preferably selected to be about 17° as seen in FIG. 11, and, when the spectrum at lower frequency is taken into account, the angle $\theta$ of about 20° is most suitable. In FIG. 11, the frequency spectrum of the MFM signal at $\theta = 20°$ is shown, by way of example. It will be seen in FIG. 11 that attenuation of −38 dB to −58 dB can be attained throughout the bandwidth of MFM modulation.

The azimuth angle $\theta$ selected in the manner above described is based upon to determine the orientation of the gaps g of the recording and reproducing head MH shown in FIG. 9. The orientation of the gaps g of the recording and reproducing head MH may be selected as shown in FIGS. 12a and 12b. In FIGS. 12a and 12b, the adjoining recording and reproducing heads $2_1$ and $2_1'$ of the multihead MH shown in FIG. 9 are merely shown for the purpose of illustration. FIG. 12a illustrates that the gap g of the forward recording and reproducing head $2_1$ is oriented to be parallel to the widthwise direction of a magnetic tape, and the gap g of the backward recording and reproducing head $2_1'$ is oriented to make the azimuth angle $\theta$ with the gap g of the head $2_1$. FIG. 12b illustrates that the gaps g of the recording and reproducing heads $2_1$ and $2_1'$ make the same angle $\frac{1}{2}\theta$ with the widthwise direction of a magnetic tape respectively.

Although all of the recording and reproducing heads $2_1, 2_2, \ldots, 2_9$ and $2_1', 2_2', \ldots, 2_9'$ of the multihead MH shown in FIG. 9 are longitudinally aligned on one line, it is not the essential requirement, and the forward recording and reproducing heads $2_1, 2_2, \ldots, 2_9$ and the backward recording and reproducing heads $2_1', 2_2', \ldots, 2_9'$ may be arranged in a relation displaced or staggered toward the left and right sides in the longitudinal direction of the magnetic tape T as shown in FIG. 13. The head arrangement shown in FIG. 13 is advantageous in that the adjacent tracks can be easily brought into intimate contact with each other, improving the recording density.

FIG. 14A is a perspective view to schematically illustrate the head gap arrangement, in the case of twoway scanning and turing over the cassette, in still another embodiment of the present invention. Referring to FIG. 14A, a stationary forward recording and reproducing magnetic head MH1 includes head gaps $g_1$, $g_2$ and $g_3$, and a stationary backward recording and reproducing magnetic head MH2 includes head gaps $g_1'$, $g_2'$ and $g_3'$. The head MH1 and MH2 are electrically switched by the head change-over means (not shown) in accordance with the forward and backward in directions of the tape.

FIG. 15 schematically shows the patterns recorded on a magnetic tape T by the magnetic heads MH1 and MH2 shown in FIG. 14A. Referring to FIG. 15, magnetization patterns $8_1$ are formed on forward recording tracks $5_1$, $5_2$ and $5_3$ by the respective head gaps $g_1$, $g_2$ and $g_3$, and magnetization patterns $8_2$ are formed on backward recording tracks $6_1$, $6_2$ and $6_3$ by the head gaps $g_1'$, $g_2'$ and $g_3'$ respectively.

Figure 20:
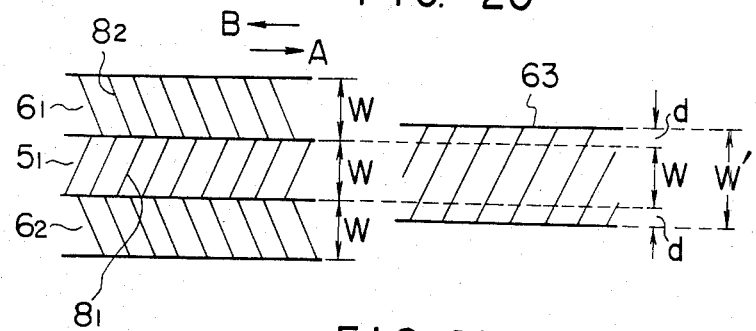
Figure 21:
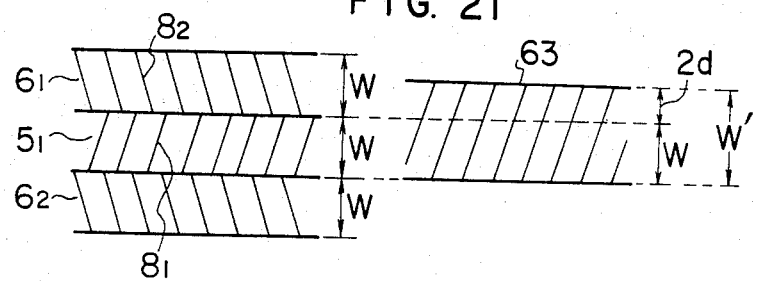
Figure 22:
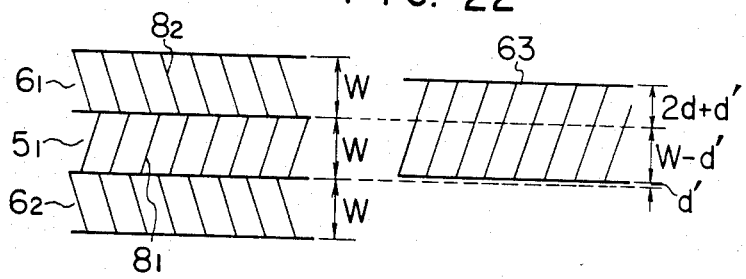

FIG. 14B illustrates the head gap arrangement when each of the recording and reproducing magnetic heads MH1 and MH2 is replaced by three recording heads R and three reproducing heads P. In this head gap arrangement, the head gap, i.e. track width, of each of the reproducing heads P is selected to be wider than that of the corresponding recording head R as shown in FIGS. 20 to 22.

In the playback mode scanning the magnetic tape T recorded with information in the manner described with reference to FIG. 15, the forward recording and reproducing magnetic head MH1 scans the forward recording tracks $5_1$, $5_2$ and $5_3$ for the purpose of reproduction, and the backward recording and reproducing magnetic head MH2 scans MH2 scans the backward recording tracks $6_1$, $6_2$ and $6_3$ for the purpose of reproduction. It is supposed now that the head gap $g_3$ of the magnetic head MH1 scans the associated recording track $5_3$ in a relation displaced by a distance d from the recording track $5_3$ in the widthwise direction of the magnetic tape T as shown in FIG. 15. Since, in such a case, the head gap $g_3$ scans a portion d of the width of the adjacent recording track $6_3$, crosstalk from the recording track $6_3$ occurs although the azimuth loss described already is present.

Let S be the level of the signal reproduced from the specific recording track $5_3$, D the level of the signal reproduced from the adjacent recording track $6_3$, W the width of these recording tracks, and $\lambda$ the wavelength of the recording signal. Then, the amount of crosstalk D/S is expressed by the following equation:

$$\frac{D}{S} = \frac{d}{W-d} \times \left| \frac{\sin\left(\frac{\pi d}{\lambda} \tan \theta\right)}{\frac{\pi d}{\lambda} \tan \theta} \right| \quad (3)$$

Suppose that the directions of the magnetization patterns formed on these two adjoining tracks are the same. Then, the angle $\theta = 0$ in the equation (3), and the amount of crosstalk D/S is now expressed as $$\frac{D}{S} = \frac{d}{W-d} \quad (4)$$

It will be apparent from comparison between the equations (3) and (4) that the amount of crosstalk given by the equation (3) is smaller than that given by the equation (4) when $\theta \neq 0$.

It will thus be seen that, when the directions of magnetization patterns formed on two adjoining recording tracks are not the same but are different from each other, crosstalk from one of the recording tracks can be sufficiently reduced by the azimuth loss regardless of relative displacement of the head gap, scanning the other recording track, toward the former recording track.

However, in the form shown in FIG. 14A, the forward recording and reproducing magnetic head MH1 associated with the forward recording tracks $5_1$, $5_2$, $5_3$ and the backward recording and reproducing magnetic head MH2 associated with the backward recording tracks $6_1$, $6_2$, $6_3$ are essentially required. Although these magnetic heads MH1 and MH2 can serve both of recording and reproduction, it is necessary to amplify the signal reproduced from the individual recording tracks in order that the reproduced signal can be obtained without degradation of the S/N ratio, and, for this purpose, amplifiers are required for the individual head gaps of each of the magnetic heads MH1 and MH2.

More precisely, a recording amplifier and a reproducing amplifier are required for each individual head gap, and this means that the number of required amplifiers is two times as large as the number of recording tracks. Also, a change-over switch for changing over between each pair of the recording amplifier and the reproducing amplifier is additionally required, and the number of such switches is equal to the number of recording tracks, resulting in complexity of the structure of the apparatus. In order that the apparatus may not become complex in structure, it is desirable to provide a single multihead and means for causing rotating movement of the single multihead.

FIG. 16A shows schematically the structure of one form of such magnetic head rotating means employed in an embodiment of the magnetic recording and reproducing apparatus according to the present invention. Referring to FIG. 16A, the rotating means includes a supporting member 45 supporting a single magnetic head MH1, a speed converter 46, a stepping motor 47 and a rotating direction controller 48. In the illustrated embodiment of the magnetic recording and reproducing apparatus of the present invention, the single magnetic head MH1 serves both of recording and reproduction, and a tape cassette containing a magnetic tape T is turned over or its widthwise upper and lower positions are changed in the backward record mode.

FIGS. 17 and 18 schematically illustrate the magnetization patterns formed on recording tracks of a magnetic tape T by the magnetic head MH1 shown in FIG. 16A. In FIGS. 16A, 17 and 18, the same reference numerals are used to designate the same or similar parts or portions appearing in FIGS. 14 and 15.

The operation of this embodiment will now be described with reference to FIGS. 16A, 17 and 18.

Referring first to FIG. 16A, the magnetic head MH1 including the head gaps $g_1$, $g_2$ and $g_3$ is supported on the supporting member 45, and this supporting member 45 can be rotated stepwise in either direction by the stepping motor 47 through the speed converter 46. Under control of the rotating direction controller 48, the stepping motor 47 causes rotating movement of the magnetic head MH1 through an angle $\theta_1$ with respect to the vertical axis X—X in one direction as shown by the arrow A or an angle $\theta_2$ in the other direction as shown by the arrow b.

The magnetic tape T is driven in the forward direction shown by the arrow A in the attitude shown in FIG. 16A, but, when it is to be driven in the backward direction shown by the arrow B, its attitude is inverted with respect to the sheet of the drawing. That is, after the magnetic tape T has completed its forward travel, the magnetic tape T is removed and is re-mounted in a relation changed in its widthwise upper and lower positions before it starts its backward travel. Thus, when the magnetic tape T is contained in, for example, a cassette, the cassette is turned over the change the travelling direction of the magnetic tape T. In other words, the edge of the magnetic tape T shown upper than the other in FIG. 16A is transferred to the position of the lower edge, and the edge shown lower than the other is transferred to the position of the upper edge. Consequently, the magnetic tape T is driven in the same direction for example, the direction of the arrow A for both of forward travel and backward travel. However, for conveniences of explanation, it is supposed herein that the magnetic tape T is driven in the direction of the arrow A for forward travel and in the direction of the arrow B for backward travel.

When the magnetic tape T is driven in the direction of the arrow A for forward travel, the magnetic head MH1 is rotated in the direction shown by the arrow a by the stepping motor 47, and, as a result, the head gaps $g_1$, $g_2$ and $g_3$ are oriented in a direction $X_1$ which makes the angle $\theta_1$ with the widthwise direction X—X of the magnetic tape T. Therefore, data are recorded on the forward recording tracks $5_1$, $5_2$ and $5_3$ of the magnetic tape T, and the direction of magnetization patterns $8_1$ formed on the forward recording tracks $5_1$, $5_2$ and $5_3$ coincides with the direction $X_1$ inclined by $\theta_1$ relative to the widthwise direction X—X of the magnetic tape T as shown in FIG. 17. The individual head gaps $g_1$, $g_2$ and $g_3$ are spaced apart from each other by the distance of their gap width, and these head gaps $g_1$, $g_2$ and $g_3$ are disposed in the widthwise direction X—X of the magnetic tape T in such a relation that one of the edges of one of the head gaps or the head gap $g_2$ in this case registers with the longitudinal centerline O—O' of the magnetic tape T. See the point 20 shown in FIG. 17.

After the magnetic tape T has completed its forward travel, the magnetic tape T is removed and remounted to be now ready for backward travel as described hereinbefore. In such a case, the head gaps $g_1$, $g_2$ and $g_3$ are situated opposite to the non-recorded portions between the forward recording tracks $5_1$, $5_2$ and $5_3$. In other words, when the magnetic tape T is inverted as described already, the recording tracks having records provided thereon are displaced in the widthwise direction X—X of the magnetic tape T by the distance of the width of the recording tracks, that is, by the distance of the width of the head gaps relative to the head gaps $g_1$, $g_2$ and $g_3$.

The magnetic head MH1 is then rotated through the angle $(\theta_1+\theta_2)$ by the stepping motor 47 controlled by the rotating direction controller 48, and the head gaps $g_1$, $g_2$ and $g_3$ are now oriented in a direction $X_2$ which makes the angle $\theta_2$, opposite to the angle $\theta_1$, which the widthwise direction X—X of the magnetic tape T. When the rotation angle $\theta_2$ of the magnetic head MH1 is equal to the rotation angle $\theta_1$, the positions of the head gaps $g_1$, $g_2$ and $g_3$ relative to the widthwise direction X—X of the magnetic tape T remain substantially unchanged regardless of the rotating movement of the magnetic head MH1.

Therefore, when the magnetic tape T is driven in the direction of the arrow B for backward travel, data are conveniently recorded on backward recording tracks $6_1$, $6_2$ and $6_3$ disposed closely adjacent to the forward recording tracks $5_1$, $5_2$ and $5_3$ respectively, as shown in FIG. 18. The direction of magnetization patterns $8_2$ formed on the backward recording tracks $6_1$, $6_2$ and $6_3$ differs by the angle $(\theta_1+\theta_2)$ from the direction of the magnetization patterns $8_1$ formed already on the forward recording tracks $5_1$, $5_2$ and $5_3$. Therefore, even if a tracking error occurs in the playback mode, crosstalk can be reduced by the azimuth loss described hereinbefore.

In this manner, the recording and reproducing magnetic head MH1 can serve the dual purpose of recording on the forward recording tracks and recording on the backward recording tracks.

On the other hand, when the rotation angle $\theta_2$ of the magnetic head MH1 is not equal to $\theta_1$, the width of records formed on the forward recording tracks $5_1$, $5_2$ and $5_3$ and that formed on the backward recording tracks $6_1$, $6_2$ and $6_3$ by recording in the presence of such an angular inequality are given by $g\cos\theta_1$ and $g\cos\theta_2$ respectively, where g is the width of the head gaps. Due to the relation $\theta_1\neq\theta_2$, the ratio between the width of records formed on the forward recording tracks and that formed on the backward recording tracks is given by $\cos\theta_1/\cos\theta_2$. Suppose that the distances from the center of rotation 20 to the remotest end points of the head gaps $g_1$, $g_2$ and $g_3$ are $l_1$, $l_2$ and $l_3$ respectively, and $\theta_1>\theta_2$ as shown in FIG. 17. Then, the records formed on the forward recording tracks $5_1$ and the backward recording tracks $6_2$, and similarly $5_3$ and $6_1$, by recording by the head gaps $g_1$, $g_2$, $g_3$ overlap each other by the widths of $|l_2(\cos\theta_2-\cos\theta_1)|$ and $|l_1(\cos\theta_2-\cos\theta_1)|$ respectively. Consequently, the width of the records formed on the recording tracks earlier than the other by the forward or backward travel of the magnetic tape T will change depending on the head gap position on the magnetic tape T.

However, in the azimuthal magnetic recording and reproducing apparatus of the present invention utilizing the azimuth loss defined already, the described change of the width of records formed on the recording tracks due to the inclination of the head gaps is only about 0.4% when the azimuth angle $(\theta_1+\theta_2)$ is selected to be about 5°. Further, the change of the width of records formed on the recording tracks depending on the head gap position on the magnetic tape T is only about 12 $\mu$m at the maximum. Such a value is allowable in practical use, when a $\frac{1}{4}$-inch magnetic tape is used and the center of rotation 20 of the magnetic head MH1 is registered with the longitudinal centerline O—O' of the magnetic tape T.

When the above-described change of the width of records formed on the recording tracks depending on the head gap position on the magnetic tape T is still undesirable in spite of the above considerations, the inclination $\theta_2$ of the magnetic head MH1 relative to the line X—X should be selected to be equal to $\theta_1$. When the relation $\theta_2=\theta_1$ is selected, the magnetization patterns formed on the magnetic tape T will be as shown in FIG. 18. It will be seen in FIG. 18 that the magnetization patterns formed on the adjacent recording tracks are symmetrical with respect to the boundary line of these recording tracks. This means that the above-described change of the record width attributable to the reciprocation of the magnetic tape T can be eliminated.

In the embodiment of the apparatus of the present invention described with reference to FIG. 16A, a magnetic head of the kind having three head gaps is employed. It is apparent, however, that a magnetic head having any other desired number of head gaps can be similarly effectively employed. It is also apparent that a magnetic head used exclusively for recording purpose and that used exclusively for reproducing purpose may be separately provided, and the orientation, or inclination, of the head gaps may be changed over depending on the travelling directions A and B of a magnetic tape.

In another form shown in FIG. 16B, recording and reproduction are performed by independent magnetic heads respectively and in the two-way scanning without inverting the cassette. Referring to FIG. 16B, a pair of reproducing heads MHF1 and MHF2 are disposed on both sides of a central recording head MHM and are held stationary, while the central recording head MHM is arranged to be rotatable as in the case of the head MH1 shown in FIG. 16A. This head MHM is rotatable and can be displaced by a distance equal to the track width in the direction of tape width, by head-shifting means (not shown). The width of the head gaps HG of the head cores P of the reproducing heads MHF1 and MHF2 is selected to be larger than that of the head cores R of the recording head MHM.

In still another embodiment of doing the twoway scanning with inverting the cassette, as shown in FIG.

16C, a single multihead MH1 includes recording heads R and reproducing heads P independent of each other. This multihead MH1 is rotated as in the case of the head MH1 shown in FIG. 16A.

FIG. 19 shows the head gap arrangement employed in another embodiment of the apparatus according to the present invention. Referring to FIG. 19, a stationary magnetic head MH3 used exclusively for recording purpose and a stationary magnetic head MH4 used exclusively for reproducing purpose are so disposed that the head gaps HG in the former and the corresponding head gaps HG in the latter are oriented to have the same angle of inclination, thereby attaining the effect similar to that exhibited by the magnetic heads MH1 and MH2 shown in FIG. 14B. In the embodiment shown in FIG. 19, a magnetic tape (not shown) is driven in one direction A and the other B as described already with reference to FIGS. 7a and 7b.

As described hereinbefore in various embodiments of the present invention, crosstalk can be eliminated practically by the effect of the azimuth loss even if a tracking error occurs during tracking of a magnetic tape T. In this connection, it is to be noted that, when a tracking error d occurs, the level S of a reproduced signal is attenuated by the amount corresponding to the decreased track width (W—d). When the track width W is sufficiently large, the reproduced signal level S is attenuated only slightly even in the presence of a slight tracking error d. However, in the case of, for example, a multitrack PCM recorder using a multitrack magnetic tape in which the width of each track is about 100 μm, the reproduced signal level S will be greatly attenuated or attenuated by 3 dB if the tracking error for the magnetic tape is as large as 30 μm. It has therefore been the prior art practice to employ a high-accuracy tape drive system for suppressing or minimizing the tracking error d thereby securing the required reproduced signal level S. The prior art apparatus has therefore been defective in that the costs of its component parts are high, and the adjustment becomes complex.

According to an embodiment of the present invention which will be described now with reference to FIGS. 20 to 22, the reproducing head gap width is selected to be larger than the recording head gap width for improving the recording density without degrading the S/N ratio of the reproduced signal and without complicating the structure of the tape drive system, especially, that of the tracking error preventing mechanism.

In FIG. 20, reference numerals $5_1$, $6_1$ and $6_2$, $8_1$, $8_2$ and $6_3$ designate a forward recording track, backward recording tracks, magnetization patterns formed on the forward recording track $5_1$, magnetization patterns formed on the backward recording tracks $6_1$, $6_2$, and tracing patterns on a track being reproduced, respectively. Referring to FIG. 20, the reproducing head gap width W' is selected to be larger by 2d than the recording head gap width W. Suppose now that the forward recording track $5_1$ is to be reproduced, and the angle of tracing for reproduction is the same as the direction of the magnetization patterns $8_1$ formed on the forward recording track $5_1$.

Explanation will proceed by citing practical numerical values in order to clarify the effect of the embodiment being described. The reproducing head gap width W' is now selected to be 140 μm when the recording head gap width W is 100 μm, and the allowance of the tracking error is set at ±20 μm. The positional relationship will be as shown in FIG. 20 in the absence of any tracking error. In this case, the reproduced signal level S is equivalent to that provided when the reproducing head gap width W'=100 μm. Due to the fact that the reproducing head gap width W' is larger by 2d than the recording head gap width W, the noise level is degraded by 140/100=1.46 dB compared with the case in which the reproducing head gap width W'=100 μm. The amount of crosstalk due to the overlap d is −39 dB when θ=20° and the recording wavelength λ=1 μm. Such a crosstalk level is negligible since it is sufficiently lower than the noise level −30 dB of the presently available system. Consequently, the total S/N ratio in the case of the reproducing head gap width W'=140 μm is degraded by 1.46 dB compared with that observed when the reproducing head gap width W'=100 μm.

FIG. 21 illustrates that the tracking error increases up to its allowance limit of +20 μm. FIG. 22 illustrates that the tracking error exceeds its allowance limit and increases up to +40 μm. In FIG. 22, symbol d' designates the portion of the recording track $5_1$ which is not traced during reproduction, and its value is 20 μm.

Table 2 shows the S/N ratio in the various cases described above.

TABLE 2

| Tracking error (μm) | S (dB) | | | N (dB) | | | Crosstalk (dB) | | | S/N degradation (dB) | | |
|---|---|---|---|---|---|---|---|---|---|---|---|---|
| | $T_R < T_P$ | $T_R = T_P$ | $T_R > T_P$ | $T_R < T_P$ | $T_R = T_P$ | $T_R > T_P$ | $T_R < T_P$ | $T_R = T_P$ | $T_R > T_P$ | $T_R < T_P$ | $T_R = T_P$ | $T_R > T_P$ |
| 0 | 0 | 0 | −4.44 | 1.46 | 0 | −2.22 | −39 | (−∞) | (−∞) | −1.46 | 0 | −2.22 |
| +20 | 0 | −1.94 | −4.44 | 1.46 | 0 | −2.22 | −42 | −42 | (−∞) | −1.46 | −1.94 | −2.22 |
| +40 | −1.94 | −4.44 | −7.96 | 1.46 | 0 | −2.22 | −42 | −42 | −42 | −3.4 | −4.44 | −5.74 |

In table 2, $T_R$ and $T_P$ designate the recording head gap width and the reproducing head gap width respectively. The measurement was made under the conditions of θ=20°, f=50 kHz, W=100 μm, and V=4.75 cm/sec.

It will be seen in Table 2 that, when the tracking error is 0 μm, the degradation of the S/N ratio is less in the case of $T_R = T_P$ than in the case of $T_R < T_P$. However, with the increase in the tracking error, the above relation is inverted. When, for example, the tracking error is +40 μm, the S/N ratio is better by about 1 dB in the case of $T_R < T_P$ than in the case of $T_R = T_P$. This difference increases with the increase in the tracking error. It can thus be seen that the system is less affected by the tracking error by selecting the reproducing head gap width $T_P$ to be larger than the recording head gap width $T_R$. Since the amount of crosstalk in such a relation is maintained at a constant value (−42 dB in Table 2) independently of the overlapping track width, the reproducing head gap width $T_P$ can be determined on the basis of the allowance level of noise N relative to the track width and also on the basis of the width W of the recording track $5_1$ interposed between the recording tracks $8_1$ and $8_2$ Further, it is a common practice to employ a magnetic head of thin film type for the purpose of recording and reproduction for such a multitrack magnetic tape by a single magnetic head, and the use of such a head is advantageous in that the printing pattern may merely be modified to change the head gap width.

Figure 23:
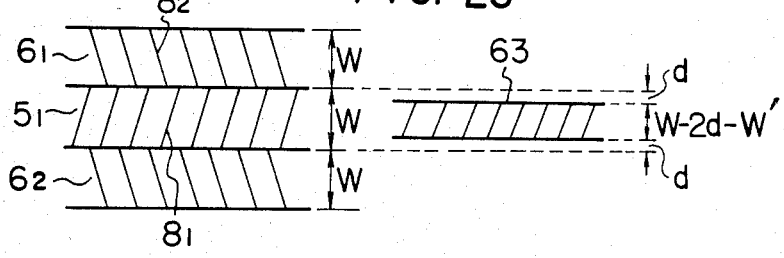

Also, as another proposal, the reproducing head gap width $T_P$ may be selected to be smaller than the recording head gap width $T_R$ as shown in FIG. 23. However, as seen in Table 2, the S/N ratio may become worse than in the case of $T_R = T_P$ depending on the selection of various values.

It will be understood from the above description of the embodiments of the present invention, the recording density on a multitrack magnetic tape can be increased or improved without complicating the structure of the tape drive system. Further, by simple adjustment, the adverse effect of the tape tracking error can be eliminated so as to maintain constant the reproduced signal level. It is to be yet noted that the larger the tracking error, the rate of degradation of the S/N ratio becomes less. This means that there is no necessity to use an expensive mechanism for the prevention of the tracking error.

As stated above, since the present invention has the arrangement that the recording angle is made to be different in accordance with the travelling direction of the tape, it is necessary to identify the travelling direction of the tape by any means.

FIGS. 24 to 30 show various forms of means for automatically identifying the travelling direction of a magnetic tape, preferably employed in the magnetic recording and reproducing apparatus of the present invention adapted for recording and reproduction by driving the magnetic tape in the forward and backward directions.

FIG. 24 is a side elevation view of a cassette casing containing a magnetic tape, employed in another embodiment of the present invention. FIG. 25 shows the structure of a mechanism for automatically identifying the travelling direction of the magnetic tape contained in the cassette casing shown in FIG. 24.

Referring to FIG. 24 showing a cassette casing 71 when viewed from the back side opposite to the tape exposed side, a pair of spaced openings 72 and 72' used for tape direction identification are provided in the back wall of the cassette casing 71.

The travelling direction of the cassette tape is determined by the direction of insertion of the cassette casing 71 into a stereo recorder. Therefore, in the form shown in FIG. 24, the openings 72 and 72' used for tape direction identification are provided in one of the halves of the back wall of the cassette casing 71 divided in the thicknesswise direction.

On the other hand, the stereo cassette recorder is provided, as shown in FIG. 25, with a pair of fingers 73 and 75 for detecting the position of one of the openings 72 and 72' shown in FIG. 24. FIG. 25 shows the mounted state of the cassette tape. The fingers 73 and 75 are made of, for example, a resilient electrical conductive metal and are disposed in such a position that the free end of one of the fingers 73 and 75 engages with one of the opens 72 and 72' when such an opening is present at that position. FIG. 25 illustrates that the lower finger 73 engages with and resiliently advances into the opening 72. By engagement of the finger 73 with the opening 72, a switch 74 is turned on. In response to the turning-on of the switch 74, the orientation of the head gaps of the magnetic head in the stereo recorder is changed in one of the two predetermined directions. For example, when the switch 74 is turned on, a head inclination change-over unit 78 is energized so as to change the inclination of a head stack 77 constituting the stereo recording and reproducing head, as shown in FIG. 26. In this case, the other finger 75 is urged by the cassette casing 71 in a direction in which another switch 76 is maintained in its off position.

In the contrary case in which the cassette casing 71 is mounted in the stereo recorder in a relation inverted or turned over from the state shown in FIG. 25, the finger 75 engages now with the other opening 72' to turn on the switch 76, and, in response to the turning-on of the switch 76, the inclination of the head stack 77 shown in FIG. 26 is changed over to the other predetermined direction from the previous direction.

In FIG. 27 showing another form of the identifying means employed in the present invention, a pair of spaced mal-erasing prevention openings 79 for preventing mal-erasing of records are provided in the back wall of a casette casing 71.

Referring to FIG. 27, the cassette casing 71 is provided with a pair of spaced means 80 and 80' used for tape direction identification. Such means 80 and 80' may be openings similar to those shown in FIG. 24 or may be conductor coatings or conductive strips exhibiting the effect similar to that exhibited in FIG. 24.

FIG. 28 shows a tape direction identification mechanism employed when the conductive strips are used as the means 80 and 80' provided for tape direction identification. Referring to FIG. 28, a pair of contacts 81 and 81' made of a resilient electrical conductor are provided in the positions of the respective fingers 73 and 75 shown in FIG. 25 to replace the latter. When the cassette casing 71 is mounted in a stereo recorder, the contacts 81 and 81' engage with the conductive strip 80, and a current path through the conductive strip 80 and contacts 81, 81' is established to energize the head inclination change-over unit 78 shown in FIG. 26 so as to incline the head stack 77 in one of the two predetermined directions.

In FIG. 29 showing still another form of the identifying means employed in the present invention, a light reflector or a light absorber is employed to replace each of the tape direction identifying means 80 and 80'.

Referring to FIG. 29, reference numerals 71, 82, 83, 84 and 85 designate a cassette casing, a light source such as a light emitting diode, a light sensor such as a photo diode, a light shielding screen, and a strip of light reflecting or absorbing material used for identifying the travelling direction of a magnetic tape, respectively. The light reflecting or absorbing strip 85 is disposed at a position similar to the disposed position of the means 80 shown in FIG. 27.

The light source 82, the light sensor 83 and the shielding screen 84 shown in FIG. 29 are disposed in a stereo recorder at such positions that, when the cassette casing 71 containing a magnetic tape is mounted in the stereo recorder, the light reflecting or absorbing strip 85 provided on the cassette casing 71 is opposed by the light source 82, light sensor 83 and shielding screen 84.

FIG. 30 shows in more detail the practical structure of the tape direction identification mechanism shown in FIG. 29. Referring to FIG. 30, the light source 82 is disposed opposite to the central area of the back wall of the cassette casing 71, and the light sensor 83 is composed of a pair of light sensing elements 83' and 83" disposed opposite to the upper and lower halves respectively of the back wall of the cassette casing 71 divided in the thicknesswise direction. The light source 82 and the light sensing elements 83' and 83" are so arranged that they are isolated from each other by the light shielding screen 84 of T shape.

Therefore, when the cassette casing 71 is mounted in the stereo recorder with the light reflecting or absorbing strip 85 being located in the position shown in FIG. 30, light emitted from the light source 82 is incident upon the light sensing elements 83' and 83" at different intensities due to the presence of the light reflecting or absorbing strip 85. Consequently, there occurs a level difference between the outputs from the two light sensing elements 83' and 83", and, on the basis of this level difference, the direction of insertion of the cassette tape, hence, the travelling direction of the magnetic tape can be identified. On the basis of the result of identification, the head inclinination changeover unit 78 controlling the inclination of the head stack 77 shown in FIG. 26 is energized to incline the head gaps of the magnetic head in one of the predetermined directions corresponding to the travelling direction of the magnetic tape.

Although, in the above description, the means employed in the embodiments of the present invention for tape direction identification have been provided on the back wall of the cassette casing, it is apparent that the effect similar to that above described can be exhibited even when such means are provided on any one of other outer walls including the labelled wall of the cassette casing or on the lable itself.

It will be understood from the above description given with reference to FIGS. 24 to 30 that the magnetic recording and reproducing apparatus of the present invention adapted for recording and reproduction using a multitrack cassette tape driven in the forward and backward directions comprises means used for identifying the travelling direction of the cassette tape and provided on one of the outer walls of the cassette casing, and means or detecting the above means provided on the cassette casing thereby identifying the travelling direction of the cassette tape when the cassette casing is mounted in the magnetic recording and reproducing apparatus. The control output from the tape direction identifying mechanism is utilized to automatically incline the head gaps of the magnetic head in one of the predetermined directions so that records provided on a recording track by the azimuth recording technique can be accurately reproduced in the playback mode. Therefore, the present invention can reliably prevent failure of reproduction due to miss-detection of the tape travelling direction or accidental erasion of records due to a mistake of recognizing a recorded tape as a non-recorded tape.

We claim:

1. An azimuthal magnetic recording and reproducing apparatus comprising a magnetic head including at least one head gap for the recording and at least one head gap for reproduction of information on and from recording tracks extending in the longitudinal direction of a magnetic tape, said head gap for recording and said head gap for reproduction including means for enabling the magnetic recording and reproducing operation so that the direction of magnetization on one of said recording tracks differs from that on the adjacent one of said recording tracks, said apparatus being of the type in which said magnetic tape is driven in a first direction and then in a second or opposite direction, said head gap for recording and said head gap for reproduction being in a first position relative to said magnetic tape when said magnetic tape is driven in said first direction and said head gap for recording and said head gap for reproduction being in a second position relative to said magnetic tape when said magnetic tape is driven in said second direction, and said apparatus further comprises magnetic head rotating means for inclining said magnetic recording and reproducing magnetic head, so that, when said magnetic tape is driven in said first direction, said magnetic head is rotated by said rotating means through a first predetermined angle in a first direction relative to the axis orthogonal with respect to the travelling direction of said magnetic tape, and, when said magnetic tape is then driven in said second direction, said magnetic head is rotated by said rotating means through a second predetermined angle in a second direction opposite to said first direction relative to said axis, said first and second predetermined angles providing an azimuth angle, and said head gap for reproduction having a width extending in a direction transverse to the direction of movement of said magnetic tape which is larger than the width of said head gap for recording.

2. An azimuthal magnetic recording and reproducing apparatus as claimed in claim 1, wherein said first and second predetermined angles are substantially equal to each other.

3. An azimuthal magnetic recording and reproducing apparatus as claimed in claim 1, further comprising means for automatically identifying the travelling direction of said magnetic tape, said magnetic head rotating means being energized in response to the output signal from said direction identifying means.

4. An azimuthal magnetic recording and reproducing apparatus as claimed in claim 3, wherein said travelling direction identifying means includes an opening provided in a portion of one of the halves of the back or side wall of a cassette containing said magnetic tape, said halves being provided by dividing the back or said wall of said cassette in its thicknesswise direction, and an electrical switch turned on by sensing the presence of said opening.

5. An azimuthal magnetic recording and reproducing apparatus as claimed in claim 3, wherein said travelling direction identifying means includes a conductive strip provided on a portion of one of the halves of the back or side wall of a cassette containing said magnetic tape, said halves being provided by dividing the back or side wall of said cassette in its thicknesswise direction, and an electrical switch including a pair of contacts establishing a closed circuit when brought into contact with said conductive strip.

6. An azimuthal magnetic recording and reproducing apparatus as claimed in claim 3, wherein said travelling direction identifying means includes a light reflecting or absorbing strip provided on a portion of one of the halves of the back or side wall of a cassette containing said magnetic tape, said halves being provided by dividing the back or side wall of said cassette in its thicknesswise direction, and means including a light source and a pair of light sensing elements disposed opposite to said light reflecting or absorbing strip to sense the rate of reflection or absorption of light by said strip.

7. An azimuthal magnetic and reproducing apparatus comprising a magnetic head means including at least one head gap for recording and at least one head gap for reproduction of information on and from recording tracks extending in the longitudinal direction of a magnetic tape, said head gap for recording and said head gap for reproduction including means for enabling the magnetic recording and reproduction operation so that the direction of magnetization on one of said recording tracks differs from that on the adjacent one of said recording tracks, said apparatus being of the type in which said magnetic head means is divided into a first magnetic head means serving for recording only and second stationary magnetic head means serving for reproduction only, said second magnetic head means including first and second head gaps participating in the reproduction operation when said magnetic tape is driven in said first and second directions respectively and defining therebetween an azimuth angle, said first and second head gaps being alternately arranged in staggered relation in a direction extending transversely to the direction of movement of said magnetic tape, said first magnetic head means being disposed between said first and second head gaps of said second magnetic head means, said apparatus further comprising magnetic head rotating means for inclining said first magnetic head means and said head gaps thereof and magnetic head moving means for moving said first magnetic head means relative to said second magnetic head means, said magnetic head rotating means rotating said first magnetic head means until the inclination of the head gaps thereof coincides with that of said first head gaps of said second magnetic head means when said magnetic tape is driven in said first direction, said magnetic head moving means moving, at the same time, said first magnetic head means until each of said head gaps thereof and each of said first head gaps are disposed at the corresponding positions in the direction transverse to the direction of movement of said magnetic tape, said magnetic head rotating means rotating said first magnetic head means until the inclination of said head gaps thereof coincides with that of said second head gaps of said second magnetic head means when said magnetic tape is driven in said second direction, said magnetic head moving means moving, at the same time, said first magnetic head means until each of said head gaps thereof and each of said second head gaps are disposed at the corresponding positions in the direction transverse to the direction of movement of said magnetic tape, said first and second head gaps of said second magnetic head means for reproduction having a width extending in the direction transverse to the direction of movement of said magnetic tape which is larger than the width of said head gaps of said first magnetic head means for recording.

8. An azimuthal magnetic recording and reproducing apparatus comprising a magnetic head means including at least one gap for the recording and at least one gap for the reproduction of information on and from recording tracks extending in the longitudinal direction of a magnetic tape, said head gap for recording and said head gap for reproduction including means for enabling the magnetic recording and reproduction operation so that the direction of magnetization on one of said recording tracks differs from that on the adjacent one of said recording tracks, said apparatus being of the type in which said magnetic tape is driven in a first direction and then in a second or opposite direction, said magnetic head gaps being in a first position relative to said magnetic tape when said magnetic tape is driven in said first direction and said magnetic head gaps being in a second different position relative to said magnetic tape when aaid magnetic tape is driven in said second direction, said magnetic head means including a recording head and a reproducing head arranged one after the other in the direction of movement of said magnetic tape, and said apparatus further comprises magnetic head rotating means for inclining said magnetic head means so that, when said magnetic tape is driven in said first direction, said magnetic head means is rotated by said rotating means through a first predetermined angle in a first direction relative to the axis orthogonal with respect to the travelling direction of said magnetic tape, and, when said magnetic tape is driven in said second direction, said magnetic head means is rotated by said rotating means through a second predetermined angle in a second direction opposite to said first direction relative to said axis and first and second predetermined angles providing an azimuth angle, said reproducing head having a head gap with a width extending in a direction transverse to the direction of movement of said magnetic tape which is selected to be larger than the width of the head gap of said recording head.

9. An azimuthal magnetic recording and reproducing apparatus including a magnetic head means including a plurality of head gaps for the recording and reproduction of information on and from recording tracks extending in the longitudinal direction of a magnetic tape, said head gap including means for enabling the magnetic recording and reproducing operation so that the direction of magnetization on one of said recording tracks differs from that on the adjacent one of said recording tracks, and said apparatus being of the type in which said magnetic tape is driven in a first direction and then in a second direction, said magnetic head gaps being in a first position relative to said magnetic tape when said magnetic tape is driven in said first direction and said magnetic head gaps being in a second different position relative to said magnetic tape when said magnetic tape is driven in said second direction, said magnetic head means including a recording head and a reproducing head arranged one after the other in the direction of movement of said magnetic tape, said reproducing head having a head gap with a width extending in a direction transverse to the direction of movement of said magnetic tape which is selected to be larger than the width of the head gap of said recording head, and said head gaps being arranged side by side with a constant pitch in the direction transverse to the tape running direction.

10. An azimuthal magnetic recording and reproducing apparatus as claimed in claim 9, wherein said apparatus further comprises magnetic head rotating means for inclining said magnetic head means so that, when said magnetic tape is driven in said first direction, said magnetic head means is rotated by said rotating means through a first predetermined angle in a first direction relative to an axis orthogonal with respect to the travelling direction of said magnetic tape, and, when said magnetic tape is then driven in said second direction, said magnetic head means is rotated by said rotating means through a second predetermined angle in a second direction opposite to said first direction relative to said axis, said first and second predetermined angles providing an azimuth angle.

11. An azimuthal magnetic recording and reproducing apparatus as claimed in claim 9 or 10, wherein said width of the head gap of the reproducing head is set to be $W+2d$, where $W$ is the width of the head gap of said recording head and $d$ is a tracking error of about 20 $\mu$m.

* * * * *